US007653581B2

(12) United States Patent
Poetzsch

(10) Patent No.: US 7,653,581 B2
(45) Date of Patent: Jan. 26, 2010

(54) METHOD AND SYSTEM FOR DERIVATIVES PRICING

(75) Inventor: Reinhard H. H. Poetzsch, Heidelberg (DE)

(73) Assignee: SAP AG, Walldorf (DE)

( * ) Notice: Subject to any disclaimer, the term of this patent is extended or adjusted under 35 U.S.C. 154(b) by 630 days.

(21) Appl. No.: 10/812,055

(22) Filed: Mar. 30, 2004

(65) Prior Publication Data
US 2005/0222934 A1 Oct. 6, 2005

(51) Int. Cl.
G06Q 40/00 (2006.01)
(52) U.S. Cl. ..................... 705/36 R; 705/37
(58) Field of Classification Search ........... 705/36 R, 705/37
See application file for complete search history.

(56) References Cited

U.S. PATENT DOCUMENTS

| | | | | |
|---|---|---|---|---|
| 4,648,038 | A * | 3/1987 | Roberts et al. | 705/36 R |
| 6,016,483 | A * | 1/2000 | Rickard et al. | 705/36 R |
| 6,061,662 | A * | 5/2000 | Makivic | 705/36 R |
| 6,173,276 | B1 * | 1/2001 | Kant et al. | 706/50 |
| 6,546,375 | B1 * | 4/2003 | Pang et al. | 705/37 |
| 6,832,233 | B2 * | 12/2004 | Umeno | 708/444 |
| 7,401,042 | B1 * | 7/2008 | Pisani | 705/36 R |
| 2001/0032029 | A1 * | 10/2001 | Kauffman | 700/99 |
| 2002/0082967 | A1 * | 6/2002 | Kaminsky et al. | 705/37 |
| 2002/0116310 | A1 * | 8/2002 | Cohen et al. | 705/36 |
| 2002/0120542 | A1 * | 8/2002 | Higgins | 705/36 |
| 2002/0178101 | A1 * | 11/2002 | Swift | 705/36 |
| 2003/0014337 | A1 * | 1/2003 | Mathews et al. | 705/35 |
| 2003/0101123 | A1 * | 5/2003 | Alvarado et al. | 705/36 |
| 2003/0101125 | A1 * | 5/2003 | McGill et al. | 705/37 |
| 2003/0208430 | A1 * | 11/2003 | Gershon | 705/36 |

FOREIGN PATENT DOCUMENTS

JP 2003067581 A * 3/2003

OTHER PUBLICATIONS

Castellacci and Siclari, Asian Basket Spreads and Other Exotic Averaging Options, Energy Power Risk management, 2003, pp. 1-7.*

(Continued)

*Primary Examiner*—Lalita M Hamilton
*Assistant Examiner*—Ann Loftus
(74) *Attorney, Agent, or Firm*—Kenyon & Kenyon LLP

(57) ABSTRACT

A method and system of calculating a net present value of an average spot basket option is provided. The method includes calculating a first and second moment of a sum of spot values of all underlyings of a basket and applying a Black-Scholes formalism to the first and second moments to determine the net present value of an average spot basket option. The method further includes calculating a modified forward spot, a modified strike value, and first and second modified normal distribution functions for application in the Black-Scholes formalism. A system in accordance with the invention includes a memory that stores data that is exercised in connection with determining the net present value, a processor that executes code to determine the net present value in accordance with the a first and second moment of the sum of spot values of all underlyings of a basket and the application of a Black-Scholes formalism to the first and second moments to determine the net present value of the average spot basket option.

11 Claims, 5 Drawing Sheets

OTHER PUBLICATIONS

Datey, Gauthier and Simonato, The Performance of Analytical Approximations for the Computation of Asian Quanto-Basket Option Prices, 2003, Multinational Finance Journal, vol. 7, No. 1&2, pp. 55-82.*

Castellacci and Siclari, Asian Basket Spreads and Other Exotic Averaging Options, Energy Power Risk management, 2003, pp. 1-7.*

Datey, Gauthier and Simonato, The Performance of Analytical Approximations for the Computation of Asian Quanto-Basket Option Prices, 2003, Multinational Finance Journal, vol. 7, No. 1&2, pp. 55-82.*

Israel Nelken, The Handbook of Exotic Options: Instruments, Analysis, and Applications, Irwin Professional Publishing, Copyright © Jess Lederman, Robert A. Klein, and Israel Nelken, 1996, Chapter 6, "Averaging Options, Valuation of Asian Options", pp. 179-185.*

David F. DeRosa, "Currency Derivatives: Pricing Theory, Exotic Options, and Hedging Applications", John Wiley & Sons, Inc., Copyright © 1998, Published simultaneously in Canada, Chapter 18, "Pricing European Average Rate Currency Options", Edmond Levy, pp. 310-325.*

John C. Hull, "Options, Futures, & Other Derivatives", Fifth Edition, Prentice Hall, 2002, ISBN 0-13-009056-5, Chapter 18, "Numerical Procedures", pp. 410-414, Chapter 19, "Exotic Options", pp. 435-449, Chapter 20, "More On Models And Numerical Procedures", pp. 456-479.*

The Handbook of Exotic Options: Instruments, Analysis, and Application, by Israel Neken, 350 pages Published by McGraw-Hill; 1 edition (Nov. 1, 1995), Language: English, US.

Options, Futures, and Other Derivatives (5th Edition), by John C. Hull, 744 pages Published by Prentice Hall; 5 edition (Jul. 3, 2002), Language: English, US.

David F. DeRosa, "Currency Derivatives: Pricing Theory, Exotic Options, and Hedging Applications", John Wiley & Sons, Inc., Copyright © 1998, Published simultaneously in Canada, Chapter 18, "Pricing European Average Rate Currency Options", Edmond Levy, pp. 310-325.

Israel Nelken, "The Handbook of Exotic Options: Instruments, Analysis, and Applications", Irwin Professional Publishing, Copyright © Jess Lederman, Robert A. Klein, and Israel Nelken, 1996, Chapter 6, "Averaging Options, Valuation of Asian Options", pp. 179-185.

John C. Hull, "Options, Futures, & Other Derivatives", Fifth Edition, Prentice Hall, 2002, ISBN 0-13-009056-5, Chapter 18, "Numerical Procedures", pp. 410-414, Chapter 19, "Exotic Options", pp. 435-449, Chapter 20, "More On Models And Numerical Procedures", pp. 456-479.

* cited by examiner

Evaluation of Average Spot Basket Options

| Evaluation parameters | | Market data | | | | |
|---|---|---|---|---|---|---|
| Evaluation date | 10/1/2003 | Riskless cc IR | 4.879016% | | | |
| Horizon date | 10/1/2003 | Riskless cc fwd. IR | 4.879016% | | | |
| | | | | | | |
| | | No. of fixed spots per ul. | 0 | | | |
| | | Sum of av. of fixed spots | 0 | | | |
| | | Next fixing date | 9/6/2006 | | | |
| Contract data | | | | Underlying 1 | Underlying 2 | Underlying 3 |
| No. of underlyings | 3 | Spot | | 13 | 44 | 33.61344538 |
| No. of averaging dates | 25 | Volatility | | 10.0% | 10.0% | 10.0% |
| 1st averaging date | 9/6/2006 | Dividend rate (cc rate) | | 4.879016% | 4.879016% | 4.879016% |
| Maturity | 9/30/2006 | | | | | |
| Strike | 89.70731092 | Correlation coefficients | | Underlying 1 | Underlying 2 | Underlying 3 |
| Put/Call | Put | | Underlying 1 | 1 | 0.5 | 0.5 |
| | | | Underlying 2 | 0.5 | 1 | 0.5 |
| | | | Underlying 3 | 0.5 | 0.5 | 1 |
| Results | | | | | | |
| NPV | 4.078182314 | | | Underlying 1 | Underlying 2 | Underlying 3 |
| Delta | | | | -0.39204672 | -0.380017754 | -0.384047918 |
| Gamma | | | | 0.026577031 | 0.026256316 | 0.026437108 |
| Interim values | | | | | | |
| Modified strike | 89.70731092 | | | | | |
| Modified fwd. spot | 90.61344538 | | | | | |
| Modified volatility | 8.291993% | | | | | |

Results from FinCad6.1 function aaAsian_basket_MC

| No. of random trials | NPV | Accuracy (2*sigma) | Percentage Accuracy | 95% confidence interval | | Runtime/min | Processor |
| | | | | low | high | | |
|---|---|---|---|---|---|---|---|
| 1000 | 3.895 | 0.346 | 8.89% | 3.549 | 4.241 | 0.02 | Celeron 700MHz |
| 100000 | 4.086 | 0.036 | 0.88% | 4.050 | 4.122 | 1 | Celeron 700MHz |
| 1000000 | 4.069 | 0.011 | 0.28% | 4.058 | 4.080 | ca. 13 | Celeron 700MHz |
| 40000000 | 4.078 | 0.002 | 0.04% | 4.076 | 4.080 | ca. 400 | Celeron 700MHz |

FIG. 5

METHOD AND SYSTEM FOR DERIVATIVES PRICING

FIELD OF THE INVENTION

The invention relates a method and system for derivatives pricing.

BACKGROUND

An option is understood to be a contract that gives a buyer a right, but not an obligation, to buy or sell an underlying asset at a specific price on or before a certain date. An option pricing formula, known as the Black-Scholes option pricing formula, provides a theoretically consistent framework for pricing options. Option pricing theory is also known as Black-Scholes theory or derivatives pricing theory.

There are basically two types of options: calls and puts. A call gives a holder a right to buy an asset at a certain price within a specific period of time. A put gives a holder a right to sell an asset at a certain price within a specific period of time. Entities that buy options are called holders and those who sell options are called writers. Based on the two types of options and the two types of entities that trade in options, there are a total of four types of participants in the options markets: buyers of calls, sellers of calls, buyers of puts, and sellers of puts.

The price at which an underlying asset can be purchased or sold, according to the terms of the option, is called the strike price. This is the price an asset must go above (for calls) or go below (for puts) before a position can be exercised. The strike price is distinguished from the spot price, which is a current price at which a particular asset can be bought or sold at a specified time and place.

There are two classes of options: American and European. The classes are based on when an exercise can occur. An American option can be exercised at any time between its date of purchase and its expiration date. A European option can only be exercised at the end of its life. An option is worthless after its expiry or exercise date has passed. This holds true for both American and European options.

The calls and puts described above may be referred to as "plain vanilla" options. Plain vanilla options can be identified as standard options. There are, however, many different types and variations of options. Non-standard options are often called "exotic options." Exotic options may use variations on payoff profiles of plain vanilla options or may differ in other respects from plain vanilla options. Exotic options may also include completely different products that nonetheless carry some type of option ability.

A "basket option" is one type of exotic option. In contrast to a plain vanilla option, the underlying asset of a basket option may consist of a number of assets. That is, $N_A \geq 1$, where $N_A$ is the number of underlying assets of a basket option. Accordingly, a basket spot price is the sum of the spot prices of each individual asset. The underlying assets may be, for example, commodities, securities, or currencies. This list of possible underlying assets is not meant to be exclusive, but rather exemplary.

A calculation of a fair market value of an exotic option, such as a typical basket option, is a computationally complex task that presently, using known tools and methods such as Monte Carlo analysis, can take several hours using a personal computer. Such time intensive calculations have been typically relegated to the "back office area," for tasks, such as risk analysis, which may be performed once a day in, for example, a banking organization. What is desirable is a method to quickly and accurately evaluate a fair value, or approximation of a fair value, of exotic options, such as basket options. It is also desirable to have a system, incorporating the desired method, which can be implemented on personal computers, which can provide accurate results within a fraction of the time now taken by standard methods, such as Monte Carlo analyses.

SUMMARY

A method and system of calculating a net present value of an average spot basket option is provided. The method includes calculating a first and second moment of a sum of spot values of all underlyings of a basket and applying a Black-Scholes formalism to the first and second moments to determine the net present value of the average spot basket option. The method further includes calculating a modified forward spot, a modified strike value, and first and second modified normal distribution functions for application in the Black-Scholes formalism.

A system in accordance with the invention includes a memory that stores data that is exercised in connection with determining the net present value, a processor that executes code to determine the net present value in accordance with the a first and second moment of the sum of spot values of all underlyings of a basket and the application of a Black-Scholes formalism to the first and second moments to determine the net present value of the average spot basket option.

The first and second moments and modified values may be given, for example, by the following equations:

$$\langle M \rangle = \frac{1}{N} \sum_{j=1}^{N_A} S(t_E) e^{g_j(t_{m+1} - t_E)} \sum_j ,$$

where $\langle M \rangle$ is a first moment of the sum of spot values $S_j(t_i)$ of all underlyings of a basket;

$\tilde{F} = \langle M \rangle$, where $\tilde{F}$ is a modified forward spot for all underlyings;

$$\langle M^2 \rangle = \frac{1}{N^2} \sum_{j=1}^{N_A} \sum_{k=1}^{N_A} S_j(t_E) S_k(t_E) e^{(g_j + g_k + \rho_{jk} \sigma_j \sigma_k)(t_{m+1} - t_E)} \sum_{jk} ,$$

where $\langle M^2 \rangle$ is the second moment of the sum of spot values $S_j(t_i)$ of all underlyings of the basket;

$$\tilde{K} = K - \sum_{j=1}^{N_A} \frac{1}{N} \sum_{i=1}^{m} S_j(t_i) ,$$

where $\tilde{K}$ is a modified strike value;

$N(+\tilde{d}_1)$, wherein $$\tilde{d}_1 = \frac{\ln \frac{\tilde{F}}{\tilde{K}}}{v} + \frac{v}{2}$$

and where $N(+\tilde{d}_1)$ is a first modified normal distribution; and $N(+\tilde{d}_2)$, wherein $\tilde{d}_2 = \tilde{d}_1 - v$ and where $N(+\tilde{d}_2)$ is a second modified normal distribution. It will be understood by those of skill in the art that "modifications" are over that of the Black-Scholes theory as conventionally used by those in the art.

BRIEF DESCRIPTION OF THE DRAWINGS

The various features of the invention will best be appreciated by simultaneous reference to the description which follows and the accompanying drawings, wherein like numerals indicate like elements, and in which:

FIG. 5 is a table that illustrates: 1) the results of a determination of a first net present value using a method disclosed herein in accordance with an embodiment of the invention, and 2) the results of a determination of a second net present value using a Monte Carlo approach.

DETAILED DESCRIPTION OF AN EMBODIMENT OF THE INVENTION

Figure 1:
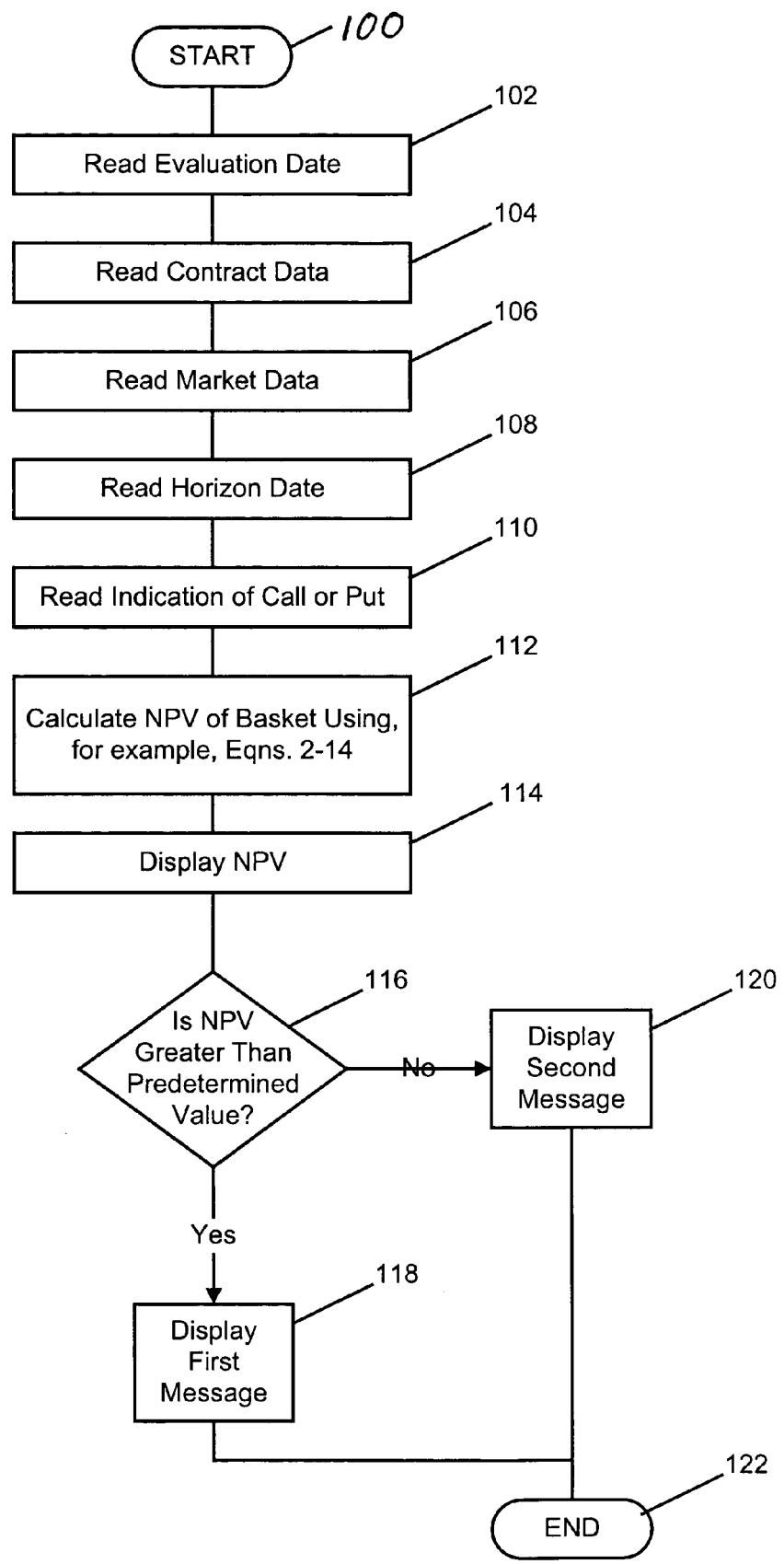
FIG. 1 is a flow diagram of a method in accordance with an embodiment of the invention.

A system and method is presented herein to quickly and accurately evaluate net present value ("NPV") and related key figures of exotic options. For purposes of example, an exotic option known as an "Asian Basket Option" is used. An "Asian Option" is an option whose payoff depends on the average price of the underlying asset over a certain period of time. This type of option may also be known as an average option. An Asian Basket Option, by extension, may be considered as an option whose payoff depends on the average price of the sum of the individual spot prices of each underlying asset in the "basket" over a certain period of time. The term Asian (basket) option includes two variants: average spot (basket) option and average strike (basket) option. While the embodiment described herein may be used for average spot (basket) options, those of skill in the art will recognize that with some straight forward extensions/generalizations the method can also be used for average strike (basket) options. The method disclosed herein is based on an analytical approach (i.e., a non-iterative approximative solution) that is able to be quickly calculated in comparison to the time required to calculate a similar value using common Monte Carlo based methods.

Description of an Average Spot Basket Option

A payoff of an Average Spot Basket Option ("ASpBO") may be calculated on a basis of an average of the sum of the averaged basket spots instead of on a basis of the current basket spot. The samples for the average are taken at a given set of instants, $t_1, t_2, \ldots, t_N$, where N is an integer value equal to or greater than 1. The instants may be any unit measure of-time, such as, for example, minutes, hours, days, or weeks.

For purposes of example, it is assumed that the averaging (of the average basket spot) is done arithmetically and with equal weights. Explicitly, a payoff, for call or put, may be written as:

$$payoff_{call/put} = \text{Max}\left\{0, +/-\left(\sum_{j=1}^{N_A} \frac{1}{N}\sum_{i=1}^{N} S_j(t_i) - K\right)\right\} \quad \text{Eqn. 1}$$

where, the plus sign in front of the bracket in equation 1 is valid for call options and the minus sign is valid for put options. The quantity $S_j(t_i)$ is the spot value of the jth asset at time $t_i$. The quantity K is the strike price.

In the formula of Eqn. 1, for the particular case of $N_A=1$, the ASpBO is an average spot option ("AspO"). In the particular case of N=1 there is no averaging, therefore the ASpBO is a plain basket option ("BO"). Accordingly, for $N_A=1$ and N=1, solving Eqn. 1 results in a plain vanilla option. The method of evaluating NPV disclosed herein is also valid for $N_A=1$ and N=1. Therefore, the method disclosed herein can be used to evaluate both plain vanilla and exotic options. It will be understood that the value $payoff_{call/put}$ of Eqn. 1 provides a value of an option at its expiration date. Values $V_{CALL}$, $V_{PUT}$, $V_{CALL/PUT}$ of Eqn. 2, which appear below, are the discounted expectation values of the payoff at an instant before the expiration date.

Dates Related to an ASpBO and its Evaluation

For an ASpBO, certain dates may be defined for use in an evaluation of its NPV. As used herein, the term "evaluation date" refers to a date for selecting the market and contract data. Market data may include, for example, interest rates, volatilities, correlations, current values of spots as quoted on various stock markets and other data as known to those of skill in the art. In a preferred embodiment, the minimum market data needed is the spot value for each underlying valid at the evaluation date, the interest rate curve of the contract currency, one volatility for each underlying, and also the correlation between all the underlyings. In a preferred embodiment, contract data includes the expiration date of the options, the identities of the underlyings (e.g., underlyings can be stocks, foreign exchanges, or anything that can be exchanged. In a preferred embodiment, the minimum contract data would be the identities of the underlyings and their amounts, and whether it is a call or a put on the underlyings, the strike price of the underlyings (the price to be paid on exercise), and a timetable or schedule as to when the spot values should be fixed in order to get their average. Furthermore, both parties to the exchange should specify the basis on which to fix the spots (e.g., the last quotation or the first quotation of a certain day).

As used herein, a "horizon date" is a date for which an NPV will be evaluated. Accordingly, and as used herein, the following abbreviations will apply:

$t_E$ Evaluation date (for selecting the market and contract data); and $t_H$ Horizon date (the NPV will be evaluated for this day).

Assumptions for Mathematical Calculations

The following assumptions may be implemented during evaluation of an AspBO in accordance with a preferred embodiment of the invention:

1) Averaging is done at certain instants $t_i$, i=1, . . . , N (discrete averaging).
2) For the sake of calculating the first and second distribution moments (see Eqns. 7 and 10, infra, respectively), averaging instants are assumed to be equidistant. However, non-equidistant averaging instants can be accommodated. In most relevant cases, an error due to this simplification is significantly less than a global error of the approach.

3) Only European style options are treated. American options cannot be evaluated using the formula of Eqn. 2.
4) A matrix formed by the correlation coefficients is positively semi definite. (This is a general expectation because all correlation matrices must be positively definite. If the product of a vector times a matrix times the same vector is greater than zero then it is positively definite, if the product can be zero then the matrix is positively semi definite.)
5) Usually, the spots $S_j(t_i)$ for dates $t_i < t_E$ are fixed prior to the evaluation. While this assumption is not mandated by the mathematics, it is desirable in order to get some error robustness (when fixings are missing). If, however, $t_i > t_E$, the method described herein can implicitly appreciate the missing fixed spots by "backward" valuation.

Evaluation of an NPV of an ASpBO

Figure 3:
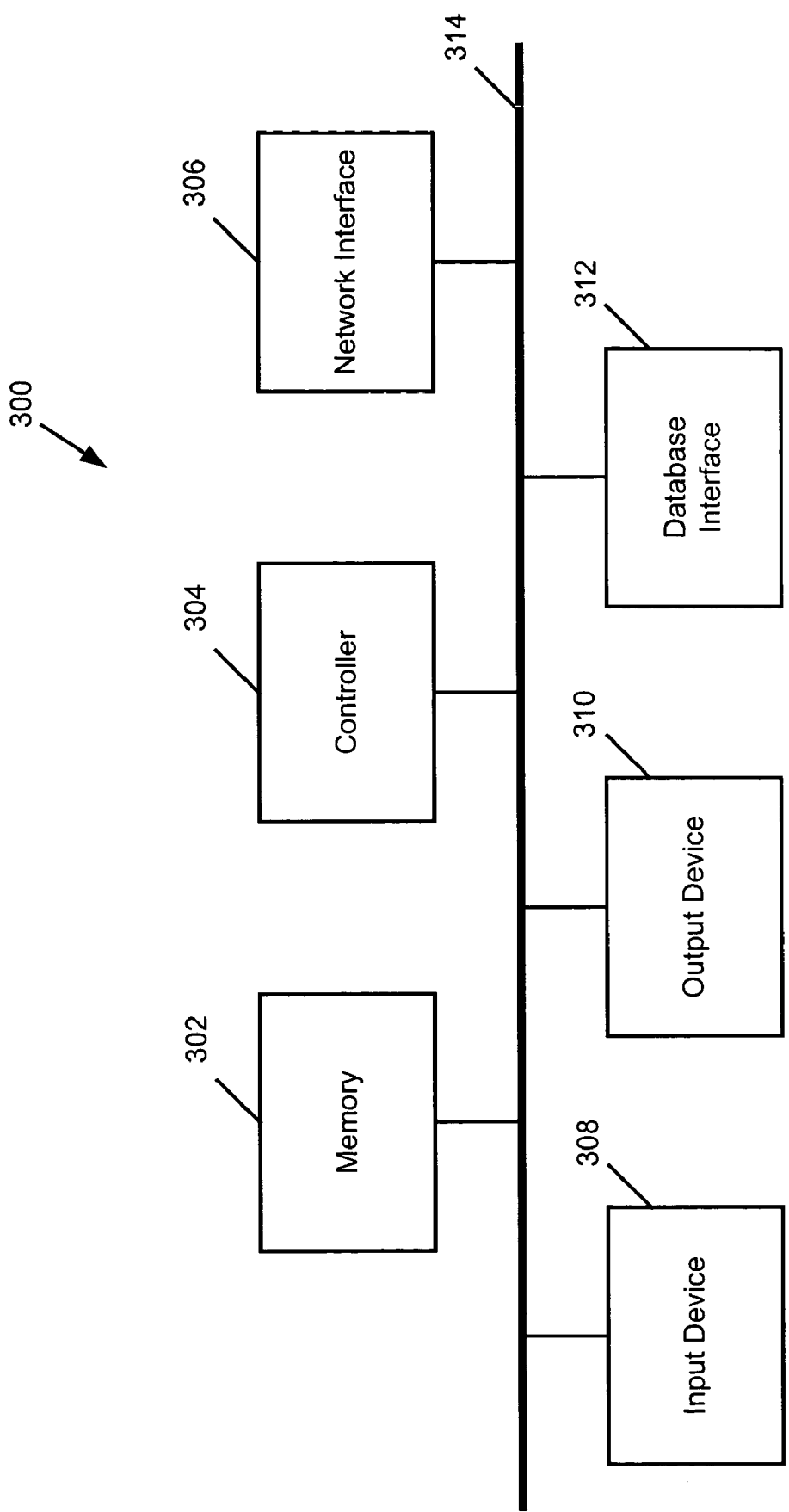
FIG. 3 illustrates an exemplary embodiment of a derivatives pricing system in accordance with an embodiment of the invention.

Referring now in detail to the drawings, there is illustrated in FIG. 1 a flow diagram of a method in accordance with an embodiment of the invention. The method begins at step 100. At step 102, an evaluation date for selecting market and contract data may be read from, for example, a memory 302 (FIG. 3). At step 104, contract data for a set of assets belonging to a basket may be read from the memory. At step 106, with knowledge of at least the evaluation date, the market data for the set of assets belonging to the basket can be read from the memory. At step 108, a horizon date, that is, a date for which the NPV will be calculated, is read from the memory. At step 110, an indication of whether the NPV is calculated for a call or a put is read from the memory. While the example above indicates that various data may be read from memory, those of skill in the art will understand that, alternatively, the data, or any subset of the data, may be directly and manually input to a program executing a method in accordance with the embodiment of the invention. For example, the evaluation date and the horizon date may be input to the program running a method in accordance with the invention by the user of the program when prompted by a message displayed to a user. It is not a requirement that all data used for execution in the program be persistently stored in a memory. Furthermore, it will be understood that any data read from a memory could, alternatively, be stored in a database (similar to 412, 414, FIG. 4), or other any other data storage devices or systems know to those of skill in the art without departing from the scope of the invention.

Those of skill in the art will recognize that while the general order of steps 102, 104, and 106 may proceed in the order specified, the order of steps 108 and 110 may be reversed or otherwise reordered or re-integrated before or interspersed with steps 102, 104, and 106. Furthermore, it will be recognized that data may be read from the memory or may be otherwise applied to any variable storage locations used for execution of computer code in accordance with a method of the invention. It will be further recognized that market data and/or contract data may have been previously stored in the memory as a result of, for example, another process that collects and updates these parameters. It is still further recognized that, in the example provided herein, while a single memory is described, the market and contract data may reside in separate memories without departing from the scope of the invention. Additionally, it will be recognized that the evaluation date, the horizon date, and/or indication of call or put may be have been predetermined or may have previously fixed by some other application. Furthermore, it will be recognized that any data required for execution of a method in accordance with the invention may be acquired from memory 302 (FIG. 3) and/or database 412, 414, without departing from the scope of the invention.

At step 112, the NPV of the basket is calculated according to the equations and boundary values set forth below. It will be understood that the abbreviation NPV is synonymous with $V_{CALL}$, $V_{PUT}$, OR $V_{CALL/PUT}$.

$$\left. \begin{array}{l} V_{call}(t_H) = e^{-r(t_H,T)(T-t_H)}\left[+\tilde{F}N(+\tilde{d}_1) - \tilde{K}N(+\tilde{d}_2)\right] \\ V_{put}(t_H) = e^{-r(t_H,T)(T-t_H)}\left[-\tilde{F}N(-\tilde{d}_1) + \tilde{K}N(-\tilde{d}_2)\right] \end{array} \right\} \text{ for } t_H \leq T \text{ and } \tilde{K} > 0$$

$$\left. \begin{array}{l} V_{call}(t_H) = e^{-r(t_H,T)(T-t_H)}\left[+\tilde{F} - \tilde{K}\right] \\ V_{put}(t_H) = 0 \end{array} \right\} \text{ for } t_H \leq T \text{ and } \tilde{K} \leq 0$$

$$V_{call/put}(t_H) = 0, \quad \text{for } t_H > T \qquad \text{Eqn. 2}$$

where $$\tilde{d}_1 = \frac{\ln\frac{\tilde{F}}{\tilde{K}}}{v} + \frac{v}{2}, \tilde{d}_2 = \tilde{d}_1 - v \qquad \text{Eqn. 3}$$

$$\tilde{K} = K - \sum_{j=1}^{N_A} \frac{1}{N} \sum_{i=1}^{m} S_j(t_i), \text{ where } t_m \text{ is latest instant with an already fixed spot} \qquad \text{Eqn. 4}$$

$$\tilde{F} = \langle M \rangle \qquad \text{Eqn. 5}$$

$$v^2 = \ln\langle M^2 \rangle - 2\ln\langle M \rangle \qquad \text{Eqn. 6}$$

$$\langle M \rangle = \frac{1}{N} \sum_{j=1}^{N_A} S_j(t_E) e^{g_j(t_{m+1} - t_E)} \sum_j, \text{ if } t_E < t_1 \text{ then set } m = 0 \qquad \text{Eqn. 7}$$

-continued $$\sum_j = \frac{1 - e^{g_j(N-m)h}}{1 - e^{g_j h}}, \text{ if } |g_j h| > \varepsilon \qquad \text{Eqn. 8}$$

otherwise $$\sum_j = \sum_{i=0}^{N-m-1} e^{g_j h i} \qquad \text{Eqn. 9}$$

$$\langle M^2 \rangle = \frac{1}{N^2} \sum_{j=1}^{N_A} \sum_{k=1}^{N_a} S_j(t_E) S_k(t_E) e^{(g_j + g_k + \rho_{jk}\sigma_j\sigma_k)(t_{m+1} - t_E)} \sum_{jk}, \text{ if } t_E < t_1, \text{ then set } m = 0 \qquad \text{Eqn. 10}$$

$$\sum_{jk} = \frac{1 - e^{(g_j + g_k + \rho_{jk}\sigma_j\sigma_k)(N-m)h}}{(1 - e^{g_j h})(1 - e^{(g_j + g_k + \rho_{jk}\sigma_j\sigma_k)h})} - \frac{e^{g_j(N-m)h} - e^{(g_j + g_k + \rho_{jk}\sigma_j\sigma_k)(N-m)h}}{(1 - e^{g_j h})(1 - e^{(g_k + \rho_{jk}\sigma_j\sigma_k)h})} + \qquad \text{Eqn.11}$$

$$\frac{e^{g_k h} - e^{g_k(N-m)h}}{(1 - e^{g_k h})(1 - e^{(g_j + \rho_{jk}\sigma_j\sigma_k)h})} - \frac{e^{(g_j + g_k + \rho_{jk}\sigma_j\sigma_k)h} - e^{(g_j + g_k + \rho_{jk}\sigma_j\sigma_k)(N-m)h}}{(1 - e^{(g_j + \rho_{jk}\sigma_j\sigma_k)h})(1 - e^{(g_j + g_k + \rho_{jk}\sigma_j\sigma_k)h})},$$

$|g_j h| > \varepsilon \cap$ $|g_k h| > \varepsilon \cap$ if $|g_j + g_k + \rho_{jk}\sigma_j\sigma_k)h| > \varepsilon \cap$ $|g_j + \rho_{jk}\sigma_j\sigma_k)h| > \varepsilon \cap$ $|g_k + \rho_{jk}\sigma_j\sigma_k)h| > \varepsilon$ otherwise $$\sum_{jk} = \sum_{i=0}^{N-m-1} \sum_{l=i}^{N-m-1} e^{g_j h l} e^{(g_k + \rho_{jk}\sigma_j\sigma_k)h i} + \sum_{i=1}^{N-m-1} \sum_{l=0}^{i-1} e^{(g_j + \rho_{jk}\sigma_j\sigma_k)h l} e^{g_k h i} \qquad \text{Eqn. 12}$$

$$h = \frac{t_N - t_{m+1}}{N - m - 1}, \text{ if } N - m > 1, \text{ otherwise set } h = 1 \qquad \text{Eqn. 13}$$

$$g_j = r(t_E, T) - q_j(t_E, T), j = 1, \ldots, N_A \qquad \text{Eqn. 14}$$

where

| | |
|---|---|
| N(x) | normal cumulative distribution |
| $r(t_1, t_2)$ | riskless domestic currency interest rate for the time span $t_1 \ldots t_2$ |
| $q_j(t_1, t_2)$ | dividend rate, or foreign currency interest rate for the time span $t_1 \ldots t_2$ |
| $S_j(t)$ | spot price of the j-th underlying asset, $j = 1, \ldots, N_A$ |
| $\sigma_j$ | volatility of the j-th underlying asset |
| $\rho_{jk}$ | correlation coefficient between the assets j and k (the correlation is related to the logarithm of the asset prices) |
| K | strike price |
| $\varepsilon$ | is a predetermined limit, for example, in one embodiment $\varepsilon$ may be taken as $10^{-6}$, of course other values are permissible. |

Those of skill in the art will understand that $e^{-r(t_H, T)(T - t_H)}$ may be considered as a discounting factor for a time span from $t_H$ to T. Furthermore, it will be understood that $\tilde{F}$, $N(+\tilde{d}_1)$, $N(+\tilde{d}_2)$, and $\tilde{K}$ may respectively represent a modified forward spot for all underlyings, a modified normal cumulative distribution function of $\tilde{d}_1$ and $\tilde{d}_2$, respectively, and a modified strike value, wherein the modification is over that of the Black-Scholes theory as conventionally used by those in the art. Additionally, it will be understood that once the first moment, $\langle M \rangle$, and the second moment $\langle M^2 \rangle$, respectively, are determined using, for example, Eqns. 7 and 10, respectively, then the variance of distribution at the time of maturity, $v^2$, may be determined, using, for example, Eqn. 6. Furthermore, the modified strike value, $\tilde{K}$, can be determined, for example, by using Eqn. 4. The values of $\tilde{d}_1$ and $\tilde{d}_2$, may, of course, be determined, for example, using Eqn. 3. These modified values may be applied to Eqn. 2, in accordance with the invention disclosed herein, to determine an NPV of an average spot basket option.

At step 114 the calculated NPV is displayed. From NPV one can calculate risk key figures, such as, for example, value at risk or sensitivity to market fluctuations. One could also calculate a hypothetical price on the assumption of certain market conditions.

In one embodiment, at step 116, the calculated NPV may be compared to a predetermined value. If the NPV is greater than the predetermined value then, at step 116, a first message is displayed, for example on output device 310 (FIG. 3). If the NPV is less than the predetermined value then, at step 118, a second message is displayed, for example on output device 310 (FIG. 3). The method ends at step 120, following either steps 116 or 118.

The predetermined value may be assigned based on a hypothesis or assumption of, for example, how much a given transaction should cost. It will be understood by those of skill in the art that in the financial industries sector in general and among financial engineers in particular, the hypothesis or assumption may have been a result of both qualitative and quantitative metrics and may involve personal or collective insight and/or experience far too complex to either quantify or qualify in this specification. Nonetheless, those of skill in the art are capable of making such hypotheses or assumptions and therefore determining the predetermined value.

Those of skill in the art will also recognize that the first and second messages may, for example, be instructions to an analyst to execute a trade, to vary input data, to postpone a trade, to request new market and/or contract data, or to vary or otherwise alter the content of the basket. The preceding list is meant to be exemplary and in no way limiting.

The NPV formula expressed by Eqn. 2, above, may be used for the purchase of an AspBO. In the case of selling the ASpBO, the sign of the NPV must be changed.

In the NPV formula expressed by Eqn. 2, above, the rates r and $q_j$ are continuously compounded rates. In a preferred mode, $r(t_H, T)$ is a forward rate to be evaluated on the basis of the interest rate structure $r(t_E, t)$.

Those of skill in the art will appreciate that in the instance where the underlyings are foreign exchanges, r is the riskless interest rate of the domestic currency and $q_j$ is the riskless interest rate of the foreign currency j. Accordingly, the spot $S_j(t_E)$ is the amount in domestic currency arising from the foreign currency amount to pay/receive on the option maturity T multiplied by the foreign-to-domestic-exchange rate valid at $t_E$.

If the modified strike $\tilde{K}$ becomes negative, then the payoff Max$[0,\pm(\tilde{F}-\tilde{K})]$ is no longer a function exhibiting a non-analytical cut-off. Instead the payoff may be expressed as $\tilde{F}-\tilde{K}$ for a call, or zero for a put.

In a preferred embodiment, the following contract data and other fixed data may be applied as input data:

| | |
|---|---|
| option type | put or call |
| N | number of averaging samples (i.e. the number of averaging instants) |
| m | number of spot values already fixed, where $t_m \leq t_E < t_{m+1}$ |
| $t_{m+1}$ | next averaging date |
| $A(t_E)$ | average value of fixed spots: $A(t_E) = \sum_{j=1}^{N_A} \frac{1}{m}\sum_{i=1}^{m} S_j(t_i)$, the fixed spot values $S_j(t_i)$ are not required to know explicitly, for the sake of evaluation it is sufficient to know the average |
| $T = t_N$ | maturity, averaging end date |
| K | strike |

In a preferred embodiment, the following market data may be applied:

| | |
|---|---|
| $S_j(t_E)$ | current spot prices |
| $r(t_E, T)$ | riskless interest rate for the time span $t_E \ldots T$ |
| $r(t_H, T) \equiv r(t_E, t_H, T)$ | riskless forward interest rate for the time span $t_H \ldots T$ |
| $q_j(t_E,T)$ | dividend rate for the time span $t_E \ldots T$ |
| $\sigma_j = \sigma_j(t_E)$ | current implied Black-Scholes volatility for the plain underlying j (underlying without averaging) |
| $\rho_{jk}$ | correlation coefficients |

The formula of Eqn. 2, used in the method disclosed hereinabove, is derived originally from an analytical approach to evaluate Average Spot Options ("ASO"). That analytical approach is generalized to an evaluation of Average Spot Basket Options (ASpBO). The analytical approach is known to those in the art as a "Levy approximation." With the generalized Levy approximation, as expressed by the formula of Eqn. 2, it is not only possible to evaluate ASpBO but also to evaluate the particular cases of:

1) an ASpBO with only one underlying, i.e., actually an ASO;
2) an ASpBO with only one averaging date, i.e., actually a plain Basket Option (BO) without averaging; and
3) an ASpBO with only one underlying and one averaging date, i.e., actually a standard option, also known as a plain vanilla option.

Because the method disclosed herein is an analytical one, it is much faster than a statistical approach, such as a Monte Carlo ("MC") based method. Using an MC method, a large number of trials of calculations that vary market conditions that may occur in the future are typically performed. The greater the number of trials, the greater the accuracy of the MC result. In test cases using a 700 MHz personal computer having an Intel® Celeron® processor, where a target accuracy of <0.1% was achieved, it took approximately 400 minutes using a MC approach but less than 1 second using the generalized Levy method disclosed herein.

It is understood that the Levy method is for an option with only one underlying, with averaging of the spot. While one could try to combine methods of determining price for basket options and methods for average spot options and could try to sequentially apply these methods, the results are not good. These are approximations and the determinations of the required approximations will have a strong impact on the price. While the modified Levy approach is also an approximation, it provides a price that has the highest surety when compared to models using the MC method. While, in principal, one could achieve greater accuracy with Monte Carlo using a huge number of trials than with the modified Levy approach, the greater accuracy would come with a penalty of time, as each trial in a MC simulation takes a finite amount of time.

It will be recognized that the Levy approximation is essentially this: If the spot values $S_j(t_i)$ are log normally distributed, the sum of these values is not log normal. Nevertheless, the sum of these spot values may have a distribution, which approximately corresponds to a log normal one. The approach described herein uses a generalization of Levy. While Levy's approach relates to one underlying, the approach herein is generalized to use more than one underlying. From the generalization it follows that all correlations, not only between pairs of underlyings, but also between pairs of underlyings at distinct future instants are taken into account. The method disclosed herein is realized through a modification to the boundary values of a Levy approximation, followed by an application of Black-Scholes formalism.

The main assumption of Levy's approach is, that the sum of future spot values (i.e., the prices of the underlying at several future instants) are log-normally distributed. The extended assumption of the method disclosed herein is that the assumption holds also for the sum containing spots of more than one underlying.

Figure 2:
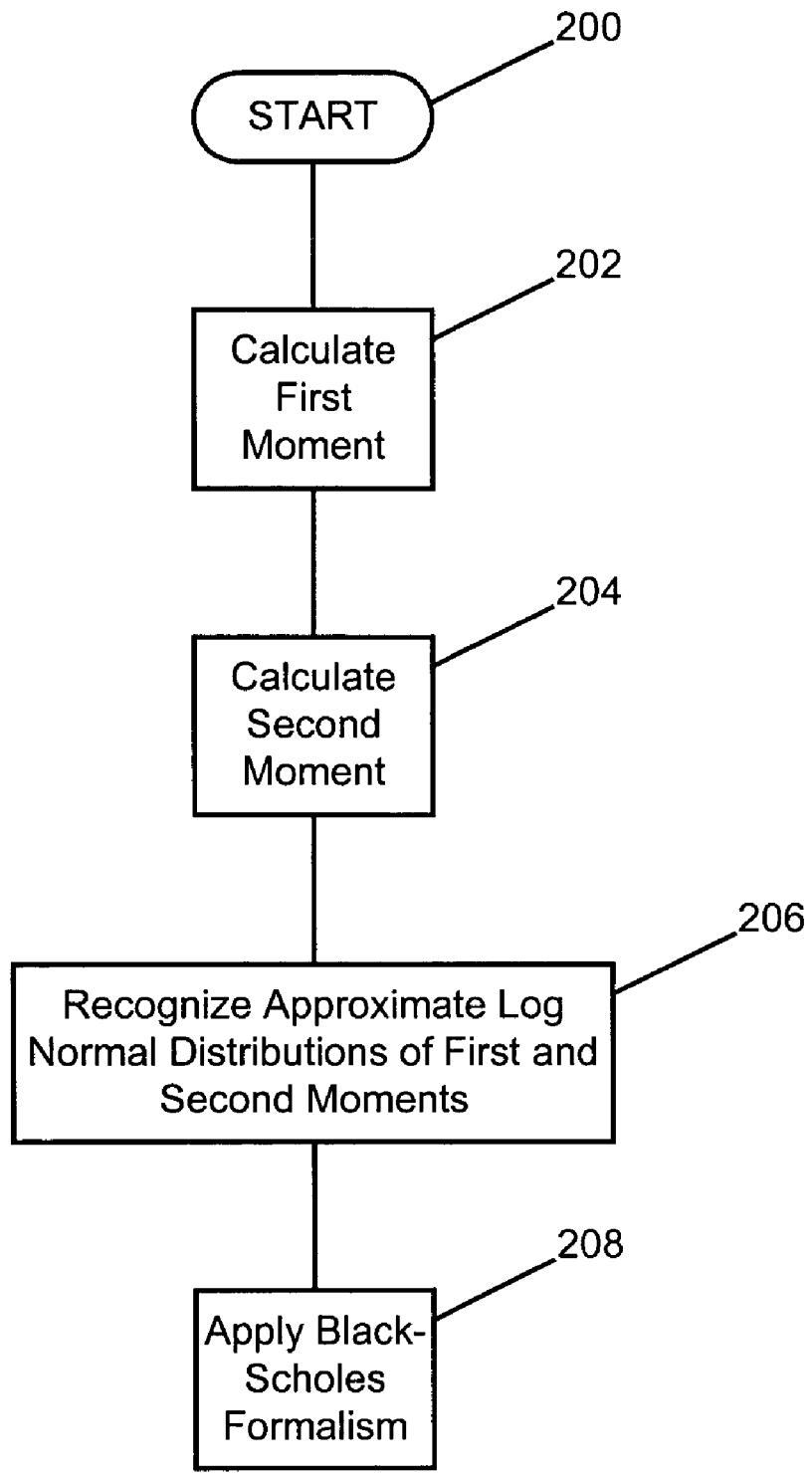
FIG. 2 is a flow diagram of a method in accordance with an embodiment of the invention.

FIG. 2 is a flow diagram of a method described herein, in accordance with an embodiment of the invention. The method of FIG. 2 starts at step 200. At step 202, a first moment of a sum of spot values $S_j(t_i)$ of the underlyings of a basket, at certain instants of time, is calculated. The first moment may be expressed by the formula of Eqn. 7, shown above. At step 204, a second moment of the sum of spot values $S_j(t_i)$ of the underlyings of the basket at certain instants of time, is calculated. The second moment may be expressed by the formula of Eqn. 10, shown above. In accordance with the method of the invention, at step 206, the first and second moments may be taken as parameters describing an approximate log normal distribution. At step 208, a Black-Scholes formalism is applied to the first and second moments to determine an NPV.

There is no closed form solution for pricing ASpBO's, BO's, or ASpO's. Acceptable approximative solutions should exhibit errors below some few base points for usual applications. The approach described herein generalizes a Levy approach to ASpBO's. The Levy approach is intended for ASpO's, see, e.g., David F. DeRosa: Currency Derivatives: Pricing Theory, Exotic Options, and Hedging Applications, John Wiley & Sons, Inc. NY (1998).

One example of a use of the disclosed invention relates to the hedging of incoming foreign cash flows. Average spot basket options or particularly average rate foreign exchange ("FX") basket options can be used to hedge incoming foreign cash flows, where the cash flows are flowing periodically (e.g., once a week). The hedge can reduce the impact of fluctuating FX rates. The expected losses can be bounded. The method and system disclosed herein for calculating NPV then allows a user to quickly and accurately, in comparison to known previously used methods, determine NPV. The determination of NPV can be done in, for example, within less than 1 second and yield a good approximation of the NPV. To get the NPV with the same accuracy by using a Monte Carlo method would take several hours on a PC. This determination provides a measure of the hedge effectiveness or the Value at Risk ("VaR") of the hedged portfolio.

FIG. 5 is a table 500 that illustrates: 1) the results of a determination of a first NPV using a method disclosed herein in accordance with an embodiment of the invention, and 2) the results of a determination of a second NPV using a Monte Carlo ("MC") approach. The MC values were obtained using FinCAD; a commercially available add-on to Excel.

Evaluation parameters 502, Contract Data 504, and Market Data 506 are identified. Results 508 are determined using a method disclosed herein. Note that use of the method disclosed herein results in a determination of an NPV=4.078182314 (see 510).

MC Results 512 are also identified. MC results are calculated for a plurality of trials. A 100 times higher number of trials will multiply the runtime by a factor of approximately 100. However, in the same time the accuracy will improve only by a factor of 10. An MC run with 40 million trails will take about 7 hours (ca. 400 minutes) on a 700 MHz personal computer having an Intel® Celeron® processor. The MC result using 40 million trials results in a determination of an NPV=4.078+/−0.002 (see 514, 516).

Correlation Coefficients in the Case of Foreign Exchange Underlyings

In the case that the basket consists of foreign currency amounts, the correlation coefficients can be expressed by the corresponding volatilities. If currency rate pairs have one currency in common (eventually the local currency, for example United States Dollars ("USD") at the foreign exchange (FX) rates of X=JPY/USD, Y=EUR/USD) the correlation can be derived from the volatility of the cross rate (Z=JPY/EUR):

$$\rho_{XY} = \frac{\sigma_X^2 + \sigma_Y^2 - \sigma_Z^2}{2\sigma_X\sigma_Y}.$$ Eqn. 15 where JPY are Japanese Yen and EUR are European Union Euros.

Correlation Option

A long position in a correlation option (CO) is composed of a short position in a BO and of long positions in plain vanilla options for each underlying contained in the basket. Alternatively, the CO may consist of an ASpBO and of corresponding ASpO's. The nominal amounts of the assets in the baskets are equal to those of the underlyings in the single options (plain vanilla options or ASpO's). The strike of the (ASp)BO is equal to the sum of the strikes of the single options. The other parameters (option style, maturity, averaging days etc.) are the same for all components of the CO.

Valuation of Correlation Option

The price of the CO is the difference of the sum of all participating strip options and the BO. The price of each component of the CO is obtained by using the formalism described, for example, in Eqns. 2-14.

$$V_{put/call}^{correl.opt.}(t_H) = \sum_{j=1}^{N_A} V_{j,put/call}^{strip.opt.}(t_H) - V_{put/call}^{basket.opt.}(t_H)$$ Eqn. 16

The valuation of the correlation option of Eqn. 16 is valid for CO's whose spots are averaged or not averaged.

FIG. 3 illustrates an exemplary embodiment of a derivatives pricing system 300 in accordance with an embodiment of the invention. The derivatives pricing system 300 illustrates an exemplary system 300 capable of executing computer code in accordance with an embodiment of the invention. The system 300, may include a memory 302, a controller or processor 304, a network interface 306, an input device 308, an output device 310, a database interface 312, all coupled to bus 314. While the diagram of FIG. 3 illustrates the exemplary items 302 through 312 as being coupled to a common bus 314, nothing herein should be construed as requiring the exemplary items 302 through 312 to be collocated or even to be restricted to use of a common bus 314.

Figure 4:
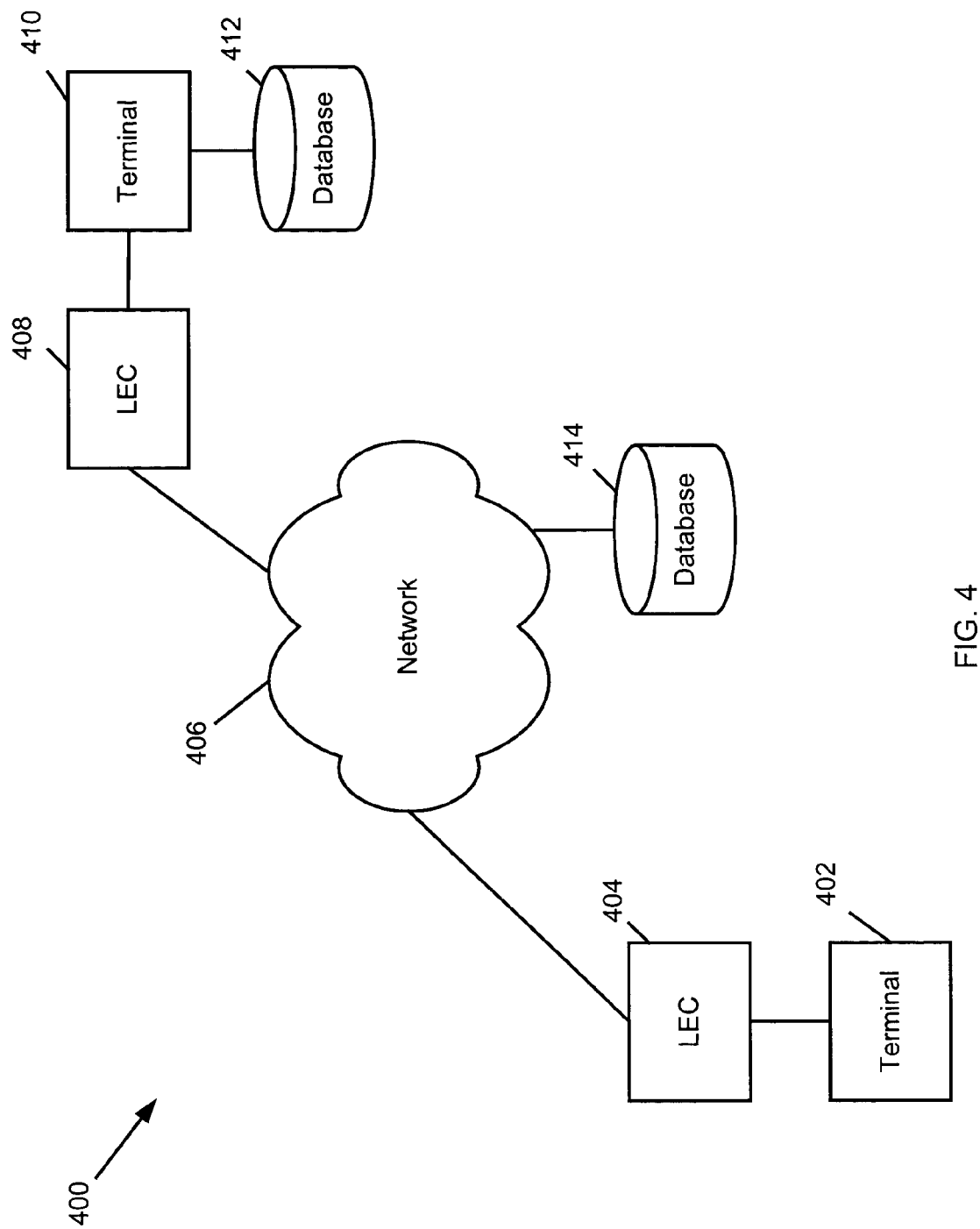
FIG. 4 illustrates a system suitable for practicing an embodiment of the invention.

Computer readable memory 302 may store computer program code segments which, when executed by a processor or controller 304 implement the functionality for this embodiment of the invention. The memory 302 may be any memory including, for example, static or dynamic random access memory, or flash memory. Memory 302 may store an operating system in addition to any instructions required to perform a method in accordance with an embodiment of the invention. Memory 302 may also be used to store market and/or contract data, but such market and/or contract data may alternatively or additionally be stored in an alternative location, such as a data storage device such as, for example, a hard disk, CD-ROM, or tape drive. Market and/or contract data may alternatively or additionally be stored in an alternative location, such as in a database 412, 414 (FIG. 4).

The controller or processor 304 may run executable code and process instructions required to perform a method in accordance with an embodiment of the invention. The controller or processor 304 need not be dedicated to running such executable code or processing such instructions and may additionally be used for other applications. For example, the controller 304 may be used to perform an e-mail application.

The network interface 306 may, for example, be any sort of data transmission or receiving device, such as a modem, a network interface card, wireless device or a telephone line transceiver. The network interface 306 operatively couples a communications network 406 (FIG. 4) to the controller 304 via common bus 314 and possibly other intermediary nodes such as, for example, local exchange carriers (LEC) 404, 408 (FIG. 4).

An input device 308, such as a keyboard or any type of data input unit, may be included in the system 300. An output device 310 may include any device or combination of devices that convert electrical signals to, for example, video images or printed images, where images includes textual representations of results of a method in accordance with the invention. The output device 310 may be located with the system 300, but may alternatively be located remotely from the system 300. Output device 310 may be coupled to controller 304 (and bus 314) via, for example, wireline, wireless, radio frequency, infrared, or optical links.

The database interface 312 provides an interface that couples the system 300 to a database 412, 414 (FIG. 4) to give the controller 304 access to data including, for example, market data and/or contract data.

FIG. 4 illustrates a system suitable for practicing an embodiment of the invention. FIG. 4 illustrates an exemplary embodiment of a derivatives pricing system 400 that includes a communications network 406 coupled to several terminals, here exemplified by terminals 402 and 410, via local exchange carriers ("LECs") 404 and 408, respectively. Databases 412 and 414 are also included in the exemplary embodiment of the derivatives pricing system 400. In the exemplary embodiment of FIG. 4, terminals 402 and 410 each are capable of executing computer code embodying a method in accordance with the invention.

A first database 412 is illustrated as being coupled to terminal 410. Such coupling may be, for example, via a direct connection or via a local area network. A second database 414 is illustrated as being coupled to the network 406. The second database 414 may be accessed by either terminal 404 or terminal 410 or both. The databases 412 and 414 may be stored on any memory device such as, for example, an optical or magnetic memory device. The databases 412 and/or 414 may each be referred to as a subscriber database as they may contain data that is unique to an individual subscriber.

The communications network 406 may be may be any type of network that carries communications including, for example, a public switched telephone network, the Internet, an intranet, a local area network (LAN), a wide area network (WAN), or any combination of communication and/or data-bearing networks including wireless networks.

The terminals 402, 410 may be, for example, personal computers or wireless devices capable of executing computer code in accordance with an embodiment of the invention. Any combinations of terminals are within the scope of the invention.

The disclosed embodiments are illustrative of the various ways in which the present invention may be practiced. Other embodiments can be implemented by those skilled in the art without departing from the spirit and scope of the present invention.

What is claimed is:

1. A computer-implemented method of calculating a net present value (NPV) of an average spot basket option, comprising:

reading an evaluation date into a memory;

accessing contract data for a plurality of underlyings belonging to a basket over a network, the contract data stored in a remote database coupled to a first computing device and accessed over the network using a database interface and a network interface;

accessing market data for plurality of underlyings belonging to the basket over the network, the market data stored in the remote database coupled to the first computing device and accessed over the network using the database interface and the network interface;

accessing an indication of whether the NPV is designated for a call or a put over the network, the indication stored in the remote database and accessed over the network using the database interface and the network interface;

calculating, using a processor, a first moment of a sum of spot values $S_j(t_i)$ of the plurality of underlyings of the basket using an equation given by $$\langle M \rangle = \frac{1}{N} \sum_{j=1}^{N_A} S(t_E) e^{g_j(t_{m+1}-t_E)} \sum_j,$$

where $N_A$ equals a number of the plurality of underlyings of the basket N is a number of averaging samples, $S_j(t_E)$ is a current spot price, $t_E$ is an evaluation date, $t_{m+1}$ is a next averaging date, $g_j$ equals a difference of a riskless domestic interest rate and a dividend or foreign interest currency rate for a predetermined time period, and wherein if $t_E < t_1$ then set m=0;

calculating using the processor, a second moment of the sum of spot values $S_j(t_i)$ of the plurality of underlyings of the basket, wherein the first and second moments are approximate log normal distributions; and applying a Black-Scholes formalism to the first and second moments to determine the net present value of an average spot basket option, wherein the variable $\Sigma_j$ of the first moment of the sum of spot values equation is represented by a first equation given by $$\Sigma_j = \frac{1 - e^{g_j(N-m)h}}{1 - e^{g_jh}},$$

if the absolute value of a value calculated using a riskless domestic interest rate and a dividend or foreign currency interest rate for the plurality of underlyings and a time interval is greater than a predetermined number and wherein the variable $\Sigma_j$ of the first moment of the sum of spot values equation is represented by a second equation given by $$\Sigma_j = \sum_{i=0}^{N-m-1} e^{g_j h i}$$

if the absolute value of the value is less than or equal to the predetermined number, wherein h is calculated from an equation given by $$\frac{t_N - t_{m+1}}{N - m - 1}$$

where m is a number of spot values already fixed.

2. The method of claim 1, wherein the first moment of the sum of spot values $S_j(t_i)$ of the plurality of underlyings of a basket is given by:

$$\langle M \rangle = \frac{1}{N} \sum_{j=1}^{N_A} S(t_E) e^{g_j(t_{m+1}-t_E)} \Sigma_j, \quad \text{if } t_E < t_1 \text{ then set } m = 0.$$

3. The method of claim 2, wherein the first moment is a modified forward spot, $\tilde{F}$, for the plurality of underlyings.

4. The method of claim 1, wherein the second moment of the sum of spot values $S_j(t_i)$ of the plurality of underlyings of a basket is given by:

$$\langle M^2 \rangle = \frac{1}{N^2} \sum_{j=1}^{N_A} \sum_{k=1}^{N_A} S_j(t_E) S_k(t_E) e^{(g_j+g_k+\rho_{jk}\sigma_j\sigma_k)(t_{m+1}-t_E)} \Sigma_{jk},$$

if $t_E < t_1$ then set m=0, wherein $\rho$ is a correlation coefficient, and wherein $\sigma$ represents a volatility of an underlying asset.

5. The method of claim 1, further comprising:
calculating a modified strike value.

6. The method of claim 5, wherein the modified strike value is given by:

$$\tilde{K} = K - \sum_{j=1}^{N_A} \frac{1}{N} \sum_{i=1}^{m} S_j(t_i),$$

wherein $t_m$ is latest instant with an already fixed spot.

7. The method of claim 1, further comprising:
calculating a first modified normal distribution function.

8. The method of claim 7, wherein the first modified normal distribution function is given by:
$N(+\tilde{d}_1)$, wherein $$\tilde{d}_1 = \frac{\ln\frac{\tilde{F}}{\tilde{K}}}{v} + \frac{v}{2}.$$

9. The method of claim 1, further comprising:
calculating a second modified normal distribution function.

10. The method of claim 9, wherein the second modified normal distribution function is given by:
$N(+\tilde{d}_2)$, wherein $\tilde{d}_2 = \tilde{d}_1 - v$.

11. The method of claim 1, further comprising:
comparing the determined net present value to a predetermined value; and
if the net present value is greater than the predetermined value, then displaying a first message on an output device, and
if the net present value is less than the predetermined value, then displaying a second message on the output device.

* * * * *

UNITED STATES PATENT AND TRADEMARK OFFICE
CERTIFICATE OF CORRECTION

PATENT NO. : 7,653,581 B2  Page 1 of 1
APPLICATION NO. : 10/812055
DATED : January 26, 2010
INVENTOR(S) : Reinhard H. H. Poetzsch It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1119 days.

Signed and Sealed this

Twenty-third Day of November, 2010

David J. Kappos
*Director of the United States Patent and Trademark Office*